Feb. 23, 1926. 1,574,517
J. ROHDIEK
PROPELLING MECHANISM FOR CHILDREN'S VEHICLES
Filed Jan. 12, 1925 2 Sheets-Sheet 2
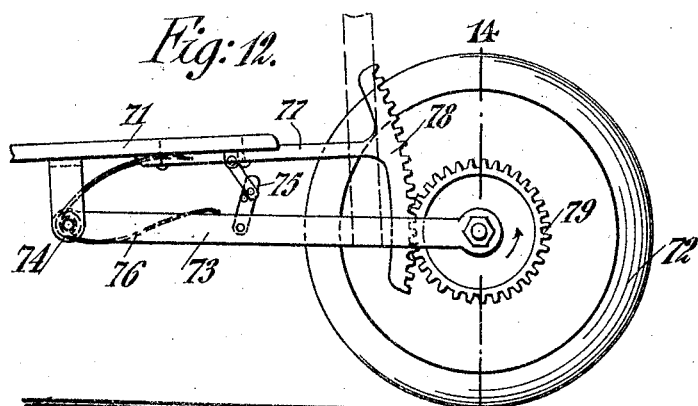
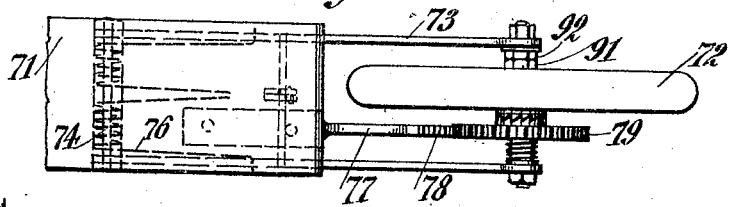
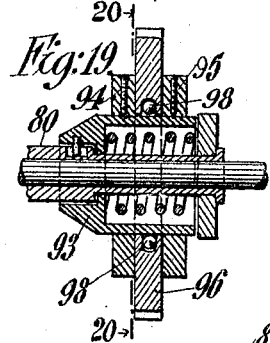
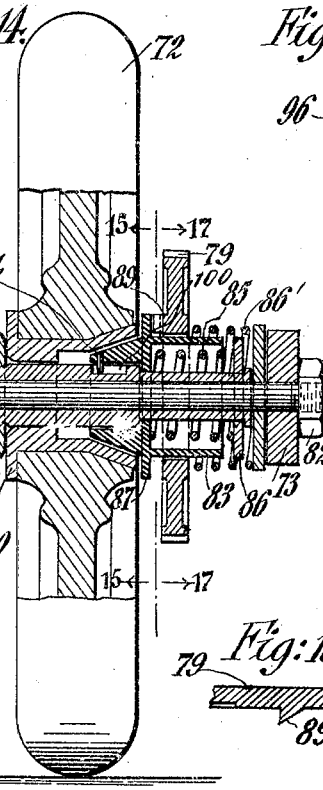
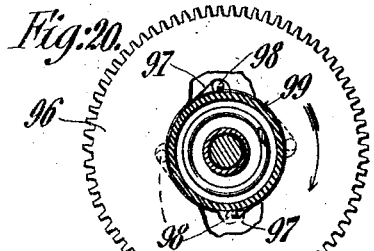
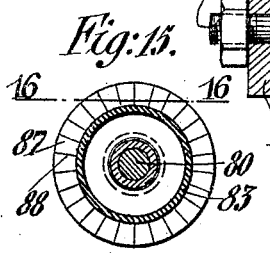
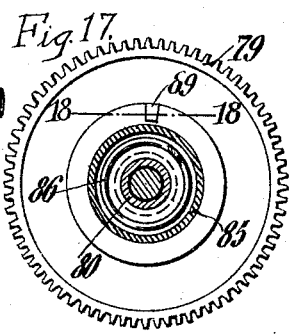
INVENTOR
John Rohdiek
BY C. P. Goepel
ATTORNEY Patented Feb. 23, 1926.

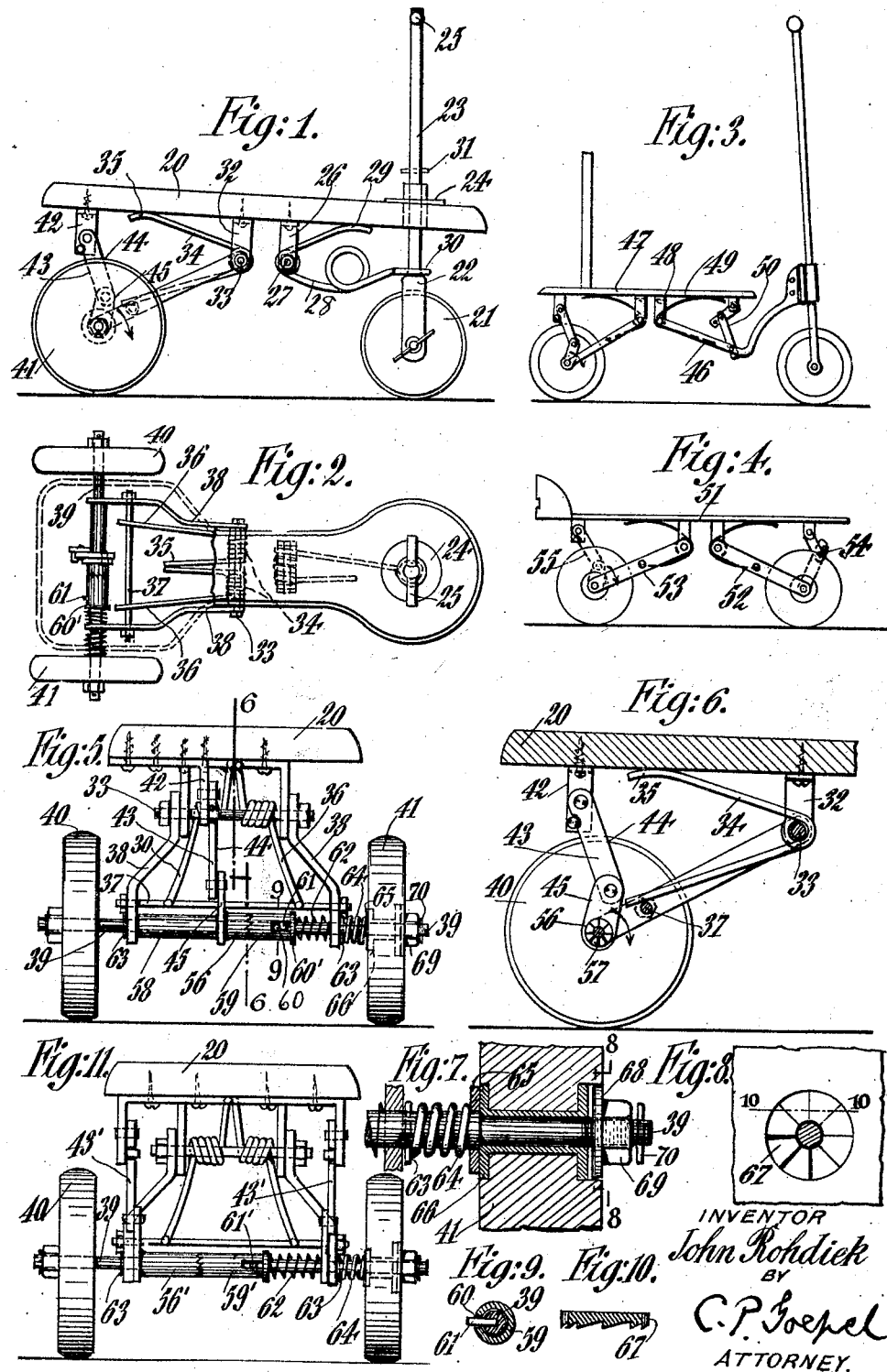
Feb. 23, 1926.
J. ROHDIEK
1,574,517
PROPELLING MECHANISM FOR CHILDREN'S VEHICLES
Filed Jan. 12, 1925
2 Sheets-Sheet 1
INVENTOR
John Rohdiek
BY
C. P. Goepel
ATTORNEY.

1,574,517

UNITED STATES PATENT OFFICE.

JOHN ROHDIEK, OF NEW YORK, N. Y.

PROPELLING MECHANISM FOR CHILDREN'S VEHICLES.

Application filed January 12, 1925. Serial No. 1,745.

*To all whom it may concern:*

Be it known that I, JOHN ROHDIEK, a citizen of the United States, resident of New York, in the county and State of New York, have invented certain new and useful Improvements in Propelling Mechanism for Children's Vehicles, of which the following is a specification.

This invention relates to skooters, skates and other toy vehicles, and more particularly to propelling mechanism for the same.

The invention consists in applying to vehicles provided with moving platforms a positive driving mechanism for initiating the movement of one or more of the wheel members in a forward direction. More specifically, the vehicle is provided with a platform member which is spring supported from independent front and rear axles, and is provided with a lever member which causes a turning movement of the rear axle as the platform is depressed. This turning movement of the axle is transmitted in a manner to grip a wheel and turn it in a forward direction, and thereafter allow the wheel to continue due to the movement imparted to it, and allow the platform to return to its uppermost position thereafter; when the depressing the platform is repeated, the axle is given a further turning movement for rotating the wheel and motion is thus imparted for driving the vehicle.

The invention will be more fully hereinafter described and several embodiments thereof are shown in the accompanying drawings, in which like numerals designate corresponding parts throughout the various figures.

In the drawings—

Figure 1 is an elevation of a child's car to which the present invention is applied;

Fig. 2 is a plan view of the same with a portion of the supporting platform broken away to show the arrangement of the supporting and driving members for the rear axle thereof;

Fig. 3 is an elevation of a modified form of the child's car;

Fig. 4 is an elevation of a skate to which the propelling mechanism is applied;

Fig. 5 is a rear end elevation on a larger scale of the kiddie car shown in Fig. 1;

Fig. 6 is a vertical sectional view taken on line 6—6 of Fig. 5;

Fig. 7 is an enlarged fragmentary sectional view of the driven wheel showing the arrangement of the axle and gripping parts;

Fig. 8 is a sectional view taken on line 8—8 of Fig. 7;

Fig. 9 is a sectional view taken on line 9—9 of Fig. 5;

Fig. 10 is a sectional view taken on line 10—10 of Fig. 8;

Fig. 11 is an end elevation similar to Fig. 5, showing a slightly modified form of shaft driving mechanism;

Fig. 12 is a fragmentary elevation of the rear end of a skooter to which propelling mechanism in accordance with this invention is applied;

Fig. 13 is a fragmentary plan view thereof;

Fig. 14 is an enlarged sectional view taken on line 14—14 of Fig. 12;

Fig. 15 is a detail sectional view of parts to the left of line 15—17 of Fig. 14;

Fig. 16 is a sectional view taken on line 16—16 of Fig. 15;

Fig. 17 is a sectional view of parts shown to the right of line 15—17 of Fig. 14;

Fig. 18 is a fragmentary sectional view taken on line 18—18 of Fig. 17;

Fig. 19 is a fragmentary sectional view of a slightly modified clutch construction for propelling the vehicle; and Fig. 20 is a sectional view taken on line 20—20 of Fig. 19, showing the propelling gear therefor.

Referring to the drawings, the vehicles shown comprise a base member having front and rear wheels which are independently pivotally connected with the base member and are provided with springs which normally tend to press the base member upwardly. The uppermost position of the base member is defined by connections with the axles of the wheels, which permit a downward movement of the base member.

Referring specifically to Fig. 1, which represents a child's car, the base member is represented by the reference numeral 20, and is provided with a front wheel 21 which is mounted in a bifurcated member 22 of an upwardly extending shaft 23, which passes through a collar member 24 of the base member. On the upper end of the shaft there is provided a handle member 25 by which the wheel may be guided. A frame member 26 is secured to the under side of the base member 20 and is provided with a pin 27 around which a spring 28 is coiled. One end of this spring, 29, engages the under side of the base member 20 and its other end is formed with a loop 30 which surrounds the shaft 23 and engages the upper portion of the bifurcated extension 22 thereof. It is to be noted here that the collar member 24 allows little play of the shaft 23 and in this way the front portion of the base is permitted to play up and down on this shaft, and if desired a pin 31 may be secured on the shaft above the collar 24 to limit the upward movement of the base 20 thereon. A frame 32 similar to frame 26 is secured to the under side of the base to the rear of the frame 26 and is provided with a pin member 33 around which is coiled a pair of springs 34. The ends 35 of these springs engage the under side of the base 20 and the ends 36 thereof engage a bolt 37 which is secured to a pair of arms 38 pivoted at one end on the pin 33. In the other end of these arms a shaft 39 is rotatably mounted and on the outer ends of this shaft are the rear wheels 40 and 41.

Adjacent to the rear end of the base 20, on the under side thereof, is a frame 42 to which is pivotally connected a buckle 43 comprising links 44 and 45 which are connected at the lower end with the axle 39. This buckle limits the upward movement of the rear end of the base 20 and is operative for propelling the vehicle in a manner hereinafter described.

Referring to Fig. 3, I have shown a slightly modified form of child's car in which the front wheel is mounted in the frame structure 46 pivotally connected with the base member 47 at 48 and provided with a spring 49 for holding the platform elevated. The platform is provided with a front buckle member 50 for limiting its upward movement. The rear end of this vehicle is similar in construction to that disclosed in Figs. 1 and 2.

In Fig. 4 a skate embodying the same construction is disclosed. The skate has front and rear wheels connected with the base portion 51 by means of spring-pressed pivotal links 52 and 53. Front links 52 are provided with similar buckle constructions 54 and the rear link 53 has the buckle constructions 55 which are employed for propelling the rear wheels of the skate which will be described in connection with the propelling mechanism for the child's car.

The propelling mechanism for these various vehicles is best represented in connection with the child's car in Figs. 2 and 5 to 10 inclusive. In this embodiment, the buckle 43 is provided connecting the base 20 with the axle 39. The link 45 is loosely pivoted on the axle and provided with a cam member 56, having one end thereof secured on one side of this link, and its opposite end is formed with ratchet teeth 57 as shown in Figs. 5 and 6. Between the opposite side of link 45 and the adjacent arm 38 is a sleeve 58 which maintains the link 45 and the cam member 56 in a central position on the shaft 39. A cam member 59, having teeth which engage the teeth 57 of the cam 56, is slidably mounted on shaft 39; this cam member 59 is provided with a slot 60 which engages a pin 61 secured in the axle 39 as shown in Figs. 5 and 9 of the drawings. Cam member 59 is normally urged into engagement with cam 56 by means of a spring 62 positioned between a washer 60' at the opposite end of this cam member and the arm 38 adjacent to it. The shaft 39 may be provided with cotter pins 63 outside of each of the arms 38 for holding the members in proper relation and in addition thereto the bolt 37 cooperates to hold the members in proper relation.

The rear wheel 40 is loosely mounted on the shaft 39 so that it is free to rotate in either direction but the wheel 41 is connected by means of a clutch arrangement hereinafter described, whereby positive rotation of shaft 39 will be transmitted for rotating the wheel 41 in a forward direction.

In the operation of this propelling mechanism, it will be noted that whenever the rear end of the base member 20 is depressed, the members of the buckle 43 will be bent together causing the link 45 to turn forwardly, that is, in a clockwise direction, and the cam member 56 will positively drive the shaft 39 through the connection afforded by pin 61 in the slot 60 of cam 59 and the engagement of the teeth of the two cam members. When the base member again rises the cam member 56 is given a partial rotation in the reverse direction and the cam member 59 is caused to press against spring 62 and allow the teeth 57 of cam 56 to ratchet over the teeth on the cam 59 until the base member is in its vertical position, and continue as long as the shaft 39 is rotating in a forward direction. Depressing the base 20 again will give another positive actuation to the shaft 39 for propelling the vehicle and the vehicle is thus caused to move forwardly.

In order that the vehicle may be pushed in a backward direction, the wheel 41 is connected with shaft 39 by means of a frictional clutch connection. This connection comprises a spring member 64 arranged between the cotter pin 63, and a washer 65 which engages the inner end of a bearing member 66 of the wheel 41, as best shown in Fig. 7. The outer end of this bearing member, as shown in Figs. 8 and 10, is provided with a ratchet surface 67 which cooperates with a corresponding surface on a washer 68 which is engaged by a nut 69 threaded upon the end of the axle 39. The amount of friction between the clutch members and the wheel may be regulated by turning the nut 69 in or out on shaft 39 and its outermost position may be determined by a collar or pin 70 extending through the axle 39.

In Fig. 11, I have shown a slightly modified construction of the child's car in which two buckle connections 43′ are used connecting the opposite side of the base 20 with the axle 39. In this construction one of the buckles 43′ is provided with a cam member 56′ which cooperates with a cam member 59′ in a similar manner as the cams 56 and 59 cooperate. This construction provides means whereby the drive of the shaft is accomplished by means of link members of buckle 43′ on the opposite side of the car and whereby a sleeve member 58 may be omitted. The operation is obviously the same as the construction particularly shown in Fig. 5.

Referring to Figs. 12 to 20, I have shown a slightly modified embodiment of the propelling mechanism which is particularly adaptable for skooters comprising a single front wheel and a single rear wheel. In Figs. 12 and 13 the rear end only of the skooter is shown. This comprises mainly a supporting base 71, a rear wheel 72, side frame members 73 in which the wheel 72 is pivotally mounted, and which frame members are pivotally connected at 74 with the base member 71. A buckle 75 is provided for limiting the upward movement of the base member caused by a spring 76 acting on the frame member 73 in the manner previously set forth. The base member 71 has a rearwardly projecting arm 77 to which is secured a gear segment 78 which meshes with a propelling gear 79 for driving the rear wheel 72 in a forward direction.

In Figs. 14 to 18 inclusive, propelling mechanism involving the principles used in the driving mechanism of the child's car heretofore set forth have been adopted. This driving mechanism comprises a shaft 80 pivotally mounted in the frame members 73. As shown in the drawings, the mounting comprises a spindle 81 passing through the shaft 80 which is hollow in construction, the ends of this spindle are bolted in position by means of nuts 82 which engage the frame members 73. On the shaft 80 is mounted a longitudinally movable drum 83 of the form best shown in Fig. 14. This drum is provided with a pin 84 which extends into a slot 100 the shaft 80 whereby slight longitudinal movement is afforded and on the interior of the drum is a spring 85 which tends to force it to the left in the position as shown in the drawings. The spring 85 rests against a fixed collar 86 secured on the end of the shaft 80.

On the exterior of the drum a flange 87 is provided having ratchet teeth 88 as best shown in the sectional views in Figs. 15 and 16. Beyond this flange the propelling gear 79 is rotatably mounted; this gear is provided with a tooth 89, as shown in Figs. 17 and 18, which tooth engages the ratchet teeth 88 on the flange 87 and when the gear 79 is rotated by the gear segment 78 in a forward direction, that is, counter-clockwise as shown in Fig. 12, the tooth 89 will engage the ratchet teeth 88 and cause the drum 83 and shaft 80 to rotate in a forward direction.

The wheels 72 may be mounted with suitable bearing members 90 on the shaft 80 and adapted to be frictionally held thereon between the drum 83 and a movable nut 91 threaded on the opposite end of shaft 80. In connection with shaft 80 a collar member 92 is fastened on the end of the shaft in order to fix the outermost position of the nut 91 whereby the friction between the shaft 80 and the wheel 72 may be adjusted.

Referring to Figs. 19 and 20, I have shown a slightly modified form of driving mechanism for the driving gear and the drum on shaft 80. In this embodiment the drum 93 which is substantially the same as drum 83 with respect to its interior construction and inner spring member, is provided on its outer surface with a pair of spaced collars 94 and 95 between which the driving gear 96 is rotatably mounted. This gear, as shown in Fig. 20, is provided with a plurality of recesses 97 into which are positioned balls or rollers 98 which are adapted to grip the outer surface 99 of the drum 93 when the gear is turned in one direction and are adapted to roll back into the recess 97 out of engagement therewith when the gear is turned in the opposite direction. In this manner I have provided a frictional gripping means for the propelling gear which will take the place of the pawl and ratchet or cam drive heretofore described, and will operate without noise. Obviously, this form of drive might be employed in the propelling mechanism for the various forms of the vehicle disclosed and it is not desired to limit the invention to the exact construction except as defined by the claims.

I claim:—

1. In combination with a vehicle including front and rear wheels, axles therefor, frame members in which said axles are mounted, a supporting platform pivotally connected with said frame members, and propelling mechanism for the vehicle comprising a buckle connection between the supporting platform and the rear axle and connections between the buckle, axle and one of the wheels for causing the wheel to rotate in one direction when the supporting member and buckle are depressed.

2. In combination with a vehicle, having an elevated supporting member, front and rear wheels having axles mounted in frames pivotally connected with the supporting member and provided with resilient means for elevating the supporting member above the wheels, propelling mechanism therefor comprising a buckle connection between the supporting member and axle for one of the wheels, and a connection between the buckle mechanism, axle and wheel for causing the wheel to be turned in one direction when the supporting member is depressed.

3. In combination with a vehicle including front and rear wheels, axles therefor, frame members in which said axles are mounted, a supporting platform pivotally connected with said frame members, and propelling mechanism for the vehicle comprising a buckle connection between the supporting platform and the rear axle, connections between the buckle, axle, and one of the wheels for causing the wheel to rotate in one direction when the supporting member and buckle are depressed, and a clutch in said connections comprising frictional driving members between the rear axle and the wheel which is to be rotated, said frictional driving member normally engaging said wheel so as to cause it to be rotated with the shaft but yieldable to allow the wheel to turn in the reverse direction when the vehicle is moved backwards.

4. In combination with a vehicle including a supporting member, front and rear wheels, axles for the wheels and propelling mechanism adapted to impart rotation to one of the wheels, connections between the propelling mechanism axle and wheel for causing the wheel to be rotated when the propelling mechanism is actuated, and a clutch in said connection comprising frictional driving members between the axle and the wheel which is to be rotated, said frictional driving members normally engaging said wheel so as to cause it to be rotated with the shaft but yieldable to allow the wheel to turn in the reverse direction when the vehicle is moved backwards.

5. A propelling mechanism for a vehicle, including an axle and a wheel connected to be rotated by the axle, a cam surrounding the axle, a reciprocating member connected with one end of said cam, ratchet teeth on the other end of the cam, a second cam member non-rotatably connected with said axle and provided with ratchet teeth adapted to cooperate with the aforesaid ratchet teeth whereby the first cam will impart a rotary movement to the second cam and axle when the reciprocating member is turned in one direction and means for holding said cam members in engagement but yieldable to allow the first cam to turn in the opposite direction when said reciprocating member is turned in the opposite direction.

6. A propelling mechanism for a vehicle, including an axle, a cam surrounding the axle, a reciprocating member connected with one end of said cam, ratchet teeth on the other end of the cam, a second cam member non-rotatably connected with said axle and provided with ratchet teeth adapted to cooperate with the aforesaid ratchet teeth whereby the first cam will impart a rotary movement to the second cam and axle when the reciprocating member is turned in one direction, means for holding said cam members in engagement but yieldable to allow the first cam to turn in the opposite direction when said reciprocating member is turned in the opposite direction, a nut on said axle adjacent to the end thereof having a frictional surface on the inner face thereof, and a wheel between the first said cam member and the frictional face of said nut adapted to be yieldingly held therebetween.

7. In a vehicle structure, the combination of a supporting member, a spring-actuated toggle on the lower part of said member comprising a lever connected to the wheel of the vehicle and pivotally connected to the supporting member, and links pivotally connected with each other and with the axle of the wheel and with the supporting member, and a spring for normally moving the axle of the wheel away from the supporting member.

In testimony that I claim the foregoing as my invention, I have signed my name hereto.

JOHN ROHDIEK.